US012756892B2

(12) United States Patent
Hung et al.

(10) Patent No.: US 12,756,892 B2
(45) Date of Patent: Oct. 6, 2026

(54) TERMINAL, METHOD AND COMPUTER PROGRAM

(71) Applicant: 17LIVE Japan INC., Tokyo (JP)

(72) Inventors: Wei-Hsiang Hung, Taipei City (TW); Po-Yi Kuo, Taipei City (TW); Che-Wei Hu, Taipei City (TW); Tsung-Tai Shih, Taipei City (TW)

(73) Assignee: 17LIVE Japan Inc., Tokyo (JP)

( * ) Notice: Subject to any disclaimer, the term of this patent is extended or adjusted under 35 U.S.C. 154(b) by 1 day.

(21) Appl. No.: 18/961,779

(22) Filed: Nov. 27, 2024

(65) Prior Publication Data

US 2025/0175668 A1 May 29, 2025

(30) Foreign Application Priority Data

Nov. 29, 2023 (JP) ................................ 2023-202236

(51) Int. Cl.

| | |
|---|---|
| ***H04N 21/433*** | (2011.01) |
| ***H04N 21/2187*** | (2011.01) |
| ***H04N 21/437*** | (2011.01) |
| ***H04N 21/442*** | (2011.01) |

(52) U.S. Cl.

CPC ..... *H04N 21/4331* (2013.01); *H04N 21/2187* (2013.01); *H04N 21/437* (2013.01); *H04N 21/44209* (2013.01)

(58) Field of Classification Search

None

See application file for complete search history.

(56) References Cited

U.S. PATENT DOCUMENTS

| | | | | |
|---|---|---|---|---|
| 9,432,444 | B1 * | 8/2016 | Cansino ................ | G06F 16/258 |
| 12,579,212 | B1 * | 3/2026 | Nandihalli .............. | G06F 9/451 |
| 2009/0119734 | A1 | 5/2009 | Deshpande et al. | |
| 2015/0249727 | A1 * | 9/2015 | Luna .................. | H03M 7/3088 709/247 |

FOREIGN PATENT DOCUMENTS

| | | | |
|---|---|---|---|
| CN | 101567875 | A | 10/2009 |
| CN | 107249140 | B | 12/2019 |
| CN | 112822270 | A | 5/2021 |
| JP | 2007336567 | A | 12/2007 |
| KR | 1020210028805 | A | 3/2021 |

OTHER PUBLICATIONS

Office Action dated Mar. 26, 2024 of the corresponding Japan patent application No. 2023-202236.

* cited by examiner

*Primary Examiner* — Omar S Parra

(74) *Attorney, Agent, or Firm* — HOLS IPR SERVICES; Chun-Ming Shih

(57) ABSTRACT

A terminal for handling data in a live streaming platform, comprising one or a plurality of processors, wherein the one or plurality of processors execute a machine-readable instruction to perform: requesting event-related data from the live streaming platform; and determining cache strategy according to timing of the progress of the event. According to the above embodiments, the cache strategy may be determined dynamically before, during and after an event. The Server load may be reduced and the responsiveness of the user terminal may also be improved. The auto-switching cache strategy may also minimize potential user misunderstandings. Therefore, the user experience may be improved.

15 Claims, 10 Drawing Sheets

320

| Stream ID | Livestreamer ID | Viewer ID |
|---|---|---|
| ST22 | 001A | SS5, SS12, SS43 |
| ST92 | 002B | TT3, TS2 |
| ... | ... | ... |

FIG. 4

322

| User ID | Point | Level | Status |
|---|---|---|---|
| 001A | 3243 | 10 | normal |
| SS5K | 1803 | 35 | VIP |
| 003C | 9201 | 90 | SVIP |
| Q12T | 2334 | 20 | normal |
| ... | ... | ... | ... |

FIG. 5

324

| Data ID | Leaderboard ID | User ID | Rank | Score | ... |
|---|---|---|---|---|---|
| DT0001 | LB001 | AK17 | 1 | 2,500,123 | ... |
| DT0002 | LB001 | K02T | 2 | 2,300,983 | ... |
| DT0003 | LB001 | DT9Q | 3 | 1,987,234 | ... |
| DT0004 | LB001 | ... | 4 | ... | ... |
| ... | ... | ... | ... | ... | ... |

FIG. 6

250

| Cache ID | Data ID | Time tag | URL | … |
|---|---|---|---|---|
| CC001 | DT0001 - DT0100 | 2023/12/12 XX:XX:XX | http://cc001.live | … |
| CC002 | DT0101 - DT0200 | … | … | … |
| … | … | | | … |

FIG. 7

252

| Queue ID | Progress | Response | Retry count | Last response time |
|---|---|---|---|---|
| DQ001 | 3,000/3,000 | success | - | 2 seconds |
| DQ002 | 1,033/2,000 | waiting | - | - |
| DQ003 | 2,123/5,000 | Fail (No response) | 25 | - |
| DQ004 | 0/1,000 | Fail (Network issue) | - | - |
| … | … | … | … | |

FIG. 8

254
| API ID | Cache Strategy |
|---|---|
| API0005 | Network First |
| API0006 | Cache Then Network |
| API0007 | Cache only |
| API0008 | Network only |
| ... | ... |
FIG. 14
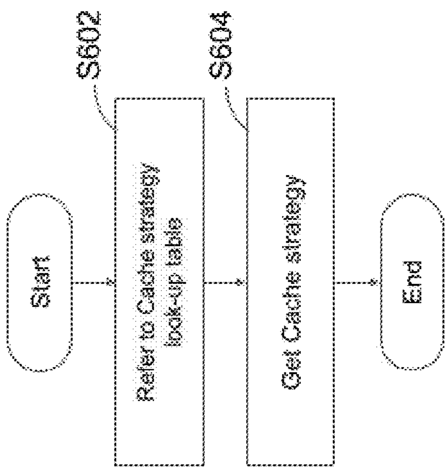
FIG. 13
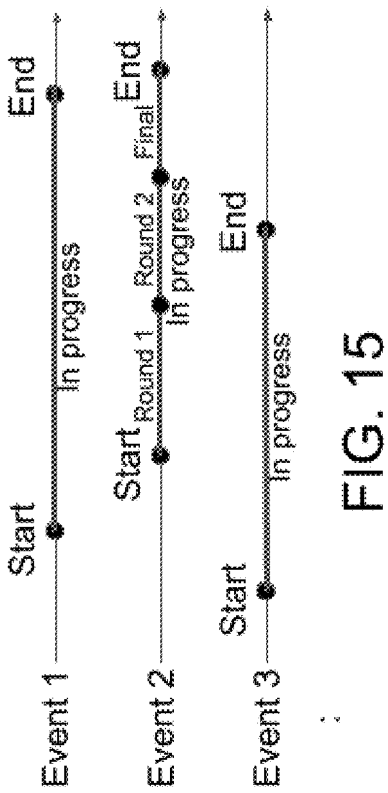
FIG. 15

TERMINAL, METHOD AND COMPUTER PROGRAM

CROSS-REFERENCE TO RELATED APPLICATIONS

This application is based on and claims the benefit of priority from Japanese Patent Application Serial No. 2023-202236 (filed on Nov. 29, 2023), the contents of which are hereby incorporated by reference in their entirety.

BACKGROUND OF THE DISCLOSURE

Technical Field

This disclosure relates to information and communication technology, and in particular, to a terminal, method and computer program in a live streaming.

Description of the Related Art

Some APPs or platforms provide live streaming service for livestreamers and viewers to interact with each other. The livestreamers may have a performance to cheer up the viewer and the viewer may donate or send gifts to support the livestreamers. Moreover, they also hold a variety of campaigns or events to attract more livestreamers and viewers to join the live streaming.

Since the interaction between livestreamers and viewers is real-time, the calculation and update of the data such as leaderboards is required to be fast and accurate. Patent Document 1 disclosed a method for displaying the leaderboard cache to release the server load and improve the information timeliness.

However, the display of the data varies depending on the network condition of the user terminal. Moreover, if a blank screen is displayed while requesting the data, it may cause the user dissatisfaction, which may lead to poor user experience. Therefore, how to handle data from the network or cache is a very important issue.

[Patent Document 1]: CN107249140B

SUMMARY OF THE DISCLOSURE

An embodiment of subject application relates to a terminal for handling data in a live streaming platform, comprising one or a plurality of processors, wherein the one or plurality of processors execute a machine-readable instruction to perform: requesting event-related data from the live streaming platform; and determining cache strategy according to timing of the progress of the event.

Another embodiment of subject application relates to a method for handling data in a live streaming platform, comprising: requesting event-related data from the live streaming platform; and determining cache strategy according to timing of the progress of the event.

Another embodiment of subject application relates to a computer program for handling data in a live streaming platform and for causing a terminal to realize the functions of: requesting event-related data from the live streaming platform; and determining cache strategy according to timing of the progress of the event.

According to the above embodiments, the cache strategy may be determined dynamically before, during and after an event. The Server load may be reduced and the responsiveness of the user terminal may also be improved. The auto-switching cache strategy may also minimize potential user misunderstandings. Therefore, the user experience may be improved.

BRIEF DESCRIPTION OF THE DRAWINGS

FIG. 4 shows an exemplary data structure of the stream DB 320 of FIG. 3;

FIG. 5 shows an exemplary data structure of the user DB 322 of FIG. 3;

FIG. 6 shows an exemplary data structure of the data DB 324 of FIG. 3;

FIG. 7 shows an exemplary data structure of the cache DB 250 of FIG. 2;

FIG. 8 shows an exemplary data structure of the data queue DB 252 of FIG. 2;

FIG. 13 is a flowchart showing steps of determining cache strategy;

FIG. 14 shows an exemplary data structure of cache strategy look-up table 254 of FIG. 2;

FIG. 15 is an exemplary functional configuration of the events in a live streaming platform;

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

The live streaming system 1 according to some embodiments of subject application provides enhancement among the users to communicate and interact smoothly. More specifically, it entertains the viewers and livestreamers in a technical way.

Figure 1:
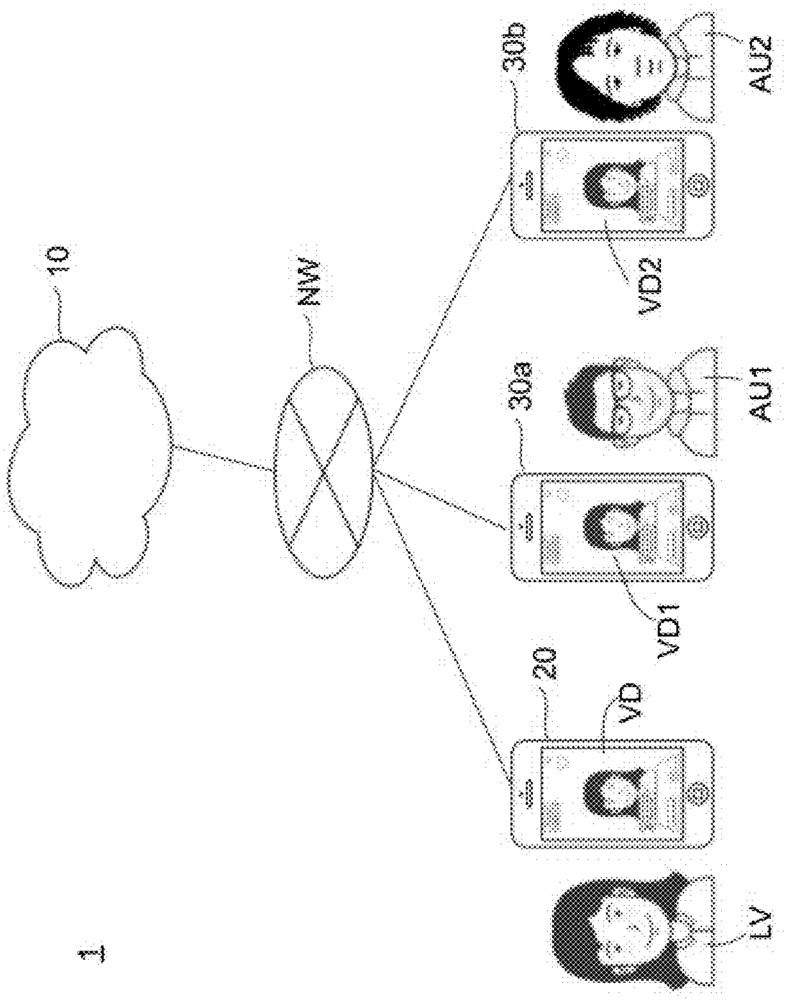
FIG. 1 is a schematic configuration of a live streaming system 1 according to some embodiments of subject application.

FIG. 1 shows a schematic configuration of a live streaming system 1 according to some embodiments of subject application. The live streaming system 1 provides a live streaming service for the streaming livestreamer (may also be referred as liver, streamer or distributor) LV and viewer (may also be referred as audience) AU (AU1, AU2 . . . ) to interact mutually in real time. As shown in FIG. 1, the live streaming system 1 may include a server 10, a user terminal 20 and a user terminal 30(30*a*, 30*b* . . . ). The user terminal 20 may be a livestreamer and the user terminal 30 may be a viewer. In some embodiments, the livestreamers and viewers may be referred to as the user. The server 10 may include one or a plurality of information processing devices connected via network NW. The user terminal 20 and 30 may be, for example, a portable terminal such as the smartphone, tablet, laptop PC, recorder, mobile game console, wearable device or the like, or the stationary computer such as desktop PC. The server 10, user terminal 20 and user terminal 30 may be communicably connected by any type of wire or wireless network NW.

The live streaming system 1 is involved in the livestreamer LV, the viewer AU, and APP provider (not shown), who provides the server 10. The livestreamer LV may record his/her own contents such as songs, talks, performance, game streaming or the like by his/her own user terminal 20 and upload to the server 10 and be the one who distributes contents in real time. In some embodiments, the livestreamer LV may interact with the viewer AU via the live streaming.

The APP provider may provide a platform for the contents to go on live streaming in the server 10. In some embodiments, the APP provider may be the media or manager to manage the real time communication between the livestreamer LV and viewer AU. The viewer AU may access the platform by the user terminal 30 to select and watch the contents he/she would like to watch. The viewer AU may perform operations to interact with the livestreamer, such as commenting or cheering the livestreamer, by the user terminal 30. The livestreamer, who provides the contents, may respond to the comment or cheer. The response of the livestreamer may be transmitted to the viewer AU by video and/or audio or the like. Therefore, a mutual communication among the livestreamer and viewer may be accomplished.

The "live streaming" in this specification may be referred to as the data transmission which enables the contents the livestreamer LV recorded by the user terminal 20 to be substantially reproduced and watched by the viewer AU via the user terminal 30, In some embodiments, the "live streaming" may also refer to the streaming which is accomplished by the above data transmission. The live streaming may be accomplished by the well-known live streaming technology such as HTTP Live Streaming, Common Media Application Format. Web Real-Time Communications, Real-Time Messaging Protocol, MPEG DASH or the like. The live streaming may further include the embodiment that the viewer AU may reproduce or watch the contents with specific delay while the livestreamer is recording the contents. Regarding the magnitude of the delay, it should be at least small enough to enable the livestreamer LV and the viewer AU to communicate. However, live streaming is different from so-called on-demand streaming. More specifically, the on-demand streaming may be referred to as storing all data, which records the contents, in the server 10 and then providing the data from the server 10 to the user at random timing according to the user's request.

The "streaming data" in this specification may be referred to as the data includes image data or voice data. More specifically, the image data (may be referred to as video data) may be generated by the image pickup feature of the user terminal 20 and 30. The voice data (may be referred to as audio data) may be generated by the audio input feature of the user terminal 20 and 30. The streaming data may be reproduced by the user terminal 20 30, so that the contents relating to users may be available for watching. In some embodiments, during the period from the streaming data being generated by the user terminal 20 of the livestreamer to being reproduced by the user terminal 30 of the viewer, the processing of changing format, size or specification of the data, such as compression, extension, encoding, decoding, transcoding or the like, is predictable. Before and after this kind of processing, the contents (such as video and audio) are substantially unchanged, so it is described in the current embodiments of the present disclosure that the streaming data before being processed is the same as that after being processed. In other words, if the streaming data is generated by the user terminal 20 of the livestreamer and reproduced by the user terminal 30 of the viewer via the server 10, the streaming data generated by the user terminal 20 of the livestreamer, the streaming data passed through the server 10 and the streaming data received and reproduced by the by the user terminal 30 of the viewer are all the same streaming data.

As shown in FIG. 1, the livestreamer LV is providing the live streaming. The user terminal 20 of the livestreamer generates the streaming data by recording his/her video and/or audio, and transmits to the server 10 via the network NW. At the same time, the user terminal 20 may display the video VD on the display of the user terminal 20 to check the streaming contents of the livestreamer LV.

The viewer AU1, AU2 of the user terminal 30*a*, 30*b*, who request the platform to provide the live streaming of the livestreamer, may receive streaming data corresponding to the live streaming via the network NW and reproduce the received streaming data to display the video VD1, VD2 on the display and output the audio from a speaker or the like. The video VD1, VD2 displayed on the user terminal 30*a*, 30*b* respectively may be substantially the same as the video VD recorded by the user terminal 20 of the livestreamer LV, and the audio outputted from the user terminal 30*a*, 30*b* may also be substantially the same as the audio recorded by the user terminal of the livestreamer LV.

The recording at the user terminal 20 of the livestreamer may be simultaneous with the reproducing of the streaming data at the user terminal 30*a*, 30*b* of the viewer AU1, AU2. If a viewer AU1 inputs a comment on the contents of the livestreamer LV into the user terminal 30*a*, the server 10 will display the comment on the user terminal 20 of the livestreamer in real time, and also display on the user terminal 30*a*, 30*b* of the viewer AU1, AU2 respectively. If the livestreamer LV responds to the comment, the response may be outputted as the text, image, video or audio from the terminal 30*a*, 30*b* of the viewer AU1, AU2, so that the communication of the livestreamer LV and viewer LV may be realized. Therefore, the live streaming system 1 may realize the live streaming of two-way communication.

Figure 2:
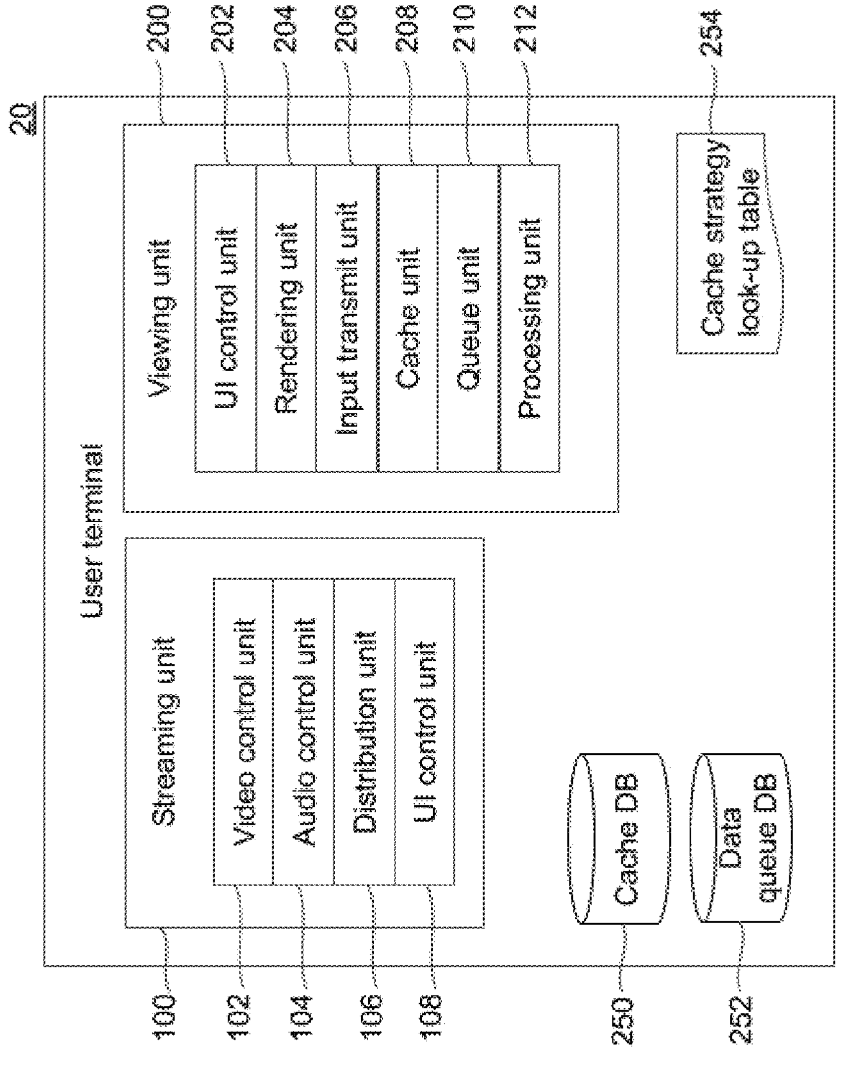
FIG. 2 is a schematic block diagram of the user terminal 20 according to some embodiments of subject application.

FIG. 2 is a block diagram showing a function and configuration of the user terminal 20 in FIG. 1 according to the embodiment of the present disclosure. The user terminal 30 has the similar function and configuration of the user terminal 20. The blocks depicted in the block diagram of this specification are implemented in hardware such as devices like a CPU of a computer or mechanical components, and in software such as a computer program depicts functional blocks implemented by the cooperation of these elements. Therefore, it will be understood by those skilled in the art that the functional blocks may be implemented in a variety of manners by a combination of hardware and software.

The livestreamer LV and viewer AU may download and install the live streaming application (live streaming APP) of the present disclosure to the user terminal 20 and 30 from the download site via network NW. Or the live streaming APP may be pre-installed in the user terminal 20 and 30. By the execution of the live streaming by the user terminal 20 and 30, the user terminals 20 and 30 may communicate with the server 10 via the network NW to realize a plurality of functions. The functions realized by the execution of the live streaming APP by the user terminal 20 and 30 (More specifically, the processor such as CPU) is described below as the functions of the user terminal 20 and 30. These functions are basically the functions that the live streaming APP makes the user terminals 20 and 30 realize. In some embodiments, these functions may also be realized by transmitting from the server 10 to the web browser of the user terminal 20 and 30 via network NW and be executed by the computer program of the web browser. The computer program may be written in the programming language such as HTML (Hyper Text Markup Language) or the like.

The user terminal 20 includes streaming unit 100 and viewing unit 200. In some embodiments, the streaming unit 100 is configured to record the audio and/or video data of the user and generate streaming data to transmit to the server 10. The viewing unit 200 is configured to receive and reproduce streaming data from the server 10. In some embodiments, a user may activate the streaming unit 100 when broadcasting or activate the viewing unit 200 when watching streaming respectively. In some embodiments, the user terminal 20 who is activating the streaming unit 100 may be referred to as a livestreamer or be referred to as the user terminal 20 which generates the streaming data. The user terminal 30 who is activating the viewing unit 200 may be referred to as an viewer or be referred to as the user terminal 30 which reproduces the streaming data.

The streaming unit 100 may include video control unit 102, audio control unit 104, distribution unit 106 and UI control unit 108. The video control unit 102 may be connected to a camera (not shown) and the video is controlled by the camera. The video control unit 102 may obtain the video data from the camera. The audio control unit 104 may be connected to a microphone (not shown) and the audio is controlled by the microphone. The audio control unit 104 may obtain the audio data from the microphone.

The distribution unit 106 receives streaming data, which includes video data from the video control unit 102 and audio data from the audio control unit 104, and transmits to the server 10 via network NW. In some embodiments, the distribution unit 106 transmits the streaming data in real-time. In other words, the generation of the streaming data from the video control unit 102 and audio control unit 104, and the distribution of the distribution unit 106 is performed simultaneously.

UI control unit 108 controls the UI for the livestreamer. The UI control unit 108 is connected to a display (not shown) and is configured to generate the streaming data to whom the distribution unit 106 transmits, reproduces and displays the streaming data on the display. The UI control unit 108 shows the object for operating or the object for instruction-receiving on the display and is configured to receive the tap input from the livestreamer.

The viewing unit 200 may include UI control unit 202, rendering unit 204, input transmit unit 206, cache unit 208, queue unit 210, cache DB 250, data queue DB 252 and cache strategy look-up table 254. The viewing unit 200 is configured to receive streaming data from the server 10 via network NW.

The UI control unit 202 controls the UI for the viewer. The UI control unit 202 is connected to a display (not shown) and/or speaker (not shown) and is configured to display the video on the display and output the audio from the speaker by reproducing the streaming data. In some embodiments, Outputting the video on the display and audio from the speaker may be referred to as "reproducing the streaming data". The UI control unit 202 may be connected to an input unit such as touch panel, keyboard or display or the like to obtain input from the users.

The rendering unit 204 may be configured to render the streaming data from the server 10 and the frame image. The frame image may include user interface objects for receiving input from the user, the comments inputted by the viewers and the data received from the server 10. The input transmit unit 206 is configured to receive the user input from the UI control unit 202 and transmit to the server 10 via the network NW.

In some embodiments, the user input may be clicking an object on the screen of the user terminal 20 such as selecting a live stream, entering a comment, sending a gift, following or unfollowing an user, voting in an event, gaming or the like. For example, the input transmit unit 206 may generate gift information and transmit to the server 10 via the internet NW if the user terminal 20 of the viewer clicks a gift object on the screen in order to send a gift to the livestreamer.

The cache unit 208 may be configured to handle the cache data. For example, the cache unit 208 may store the network data from the server 10 as cache data at the cache DB 250. The cache unit 208 may also retrieve the cache data from the cache DB 250 for displaying on the user terminal 20 of the user. In some embodiments, the cache unit 208 may display the available cache data first once the user requests data by the user terminal 20. In some embodiments, the cache unit 208 may display the cache data if the network data from the server 10 is not available. In some embodiments, the cache unit 208 may also update, delete, modify the cache data or the like.

The queue unit 210 may be configured to handle the downloading of network data from the server 10. In some embodiments, the queue unit 210 may control the queue of downloading data at the data queue DB 252. More specifically, once the user requests data from the server 10, the queue unit 210 may store a data queue of the downloading data at the data queue DB 252 to control the downloading of the data.

The user may use the user terminal 20 to request data from the server 10. For example, if the terminal is a smartphone, the user may request live streaming data via APP or the like. If the terminal is a desktop PC, the user may request live streaming data via browser or the like. In some embodiments, the user may request a plurality of data from the live streaming platform. For example, the live streaming data in a streaming room or leaderboard data in an event may be requested. In some embodiments, the requested data may also be any possible data from the live streaming service.

Once the user accesses a page such as the leaderboard page, the queue unit 210 may start to request data from the server 10. The leaderboard may include a plurality of data such as description, rule and leaderboard of the event. The leaderboard may further include the ranking of the user and the current score they received or the like. In some embodiments, the current score may include a sub-page showing the composition of the score, bonuses obtained from the previous round or the like.

The processing unit 212 may be configured to determine cache strategy of the requested data from the server 10. Here, the cache strategy may refer to the setting of rules on determining how data is retrieved, stored, updated or the like. The cache strategy may include, for example, cache only, cache then network, network first, network only or the like. The processing unit 212 may determine cache strategy of the requested data flexibly according to a variety of factors.

Here, the cache strategy of "cache only" may refer to the requested data being fetched from the cache only and no network to fall back to. The cache only strategy ensures that responses are obtained from a cache. This cache only strategy is used on data that, for example, would never change once it is cached the first time. For example, the leaderboard data in an event could never change before the beginning or after the end of the event, so it may be cached once and served solely from the cache.

Here, the cache strategy of "network only" may refer to the requested data being fetched from the network only and not any cache to fall back to. This network only strategy is used if the requests need to be fulfilled from the network. Unlike the Cache Only strategy, this strategy is used on data that changes frequently. For example, the leaderboard data in an event changes frequently right before the end of the event, so the network only may be applied to display the latest data to the users.

Here, the cache strategy of "network first", or "network falling back to cache", may refer to the requested data being fetched from the latest response via the network. In the network first strategy, it would try to fetch the latest response from the network by default. If the request is successful, the requested data would also be put in the cache. If the network fails to return a response, the cached response would be used. This network first strategy is the ideal solution for the data that are updating frequently. For example, the leaderboard data in the event could change frequently during the event, so it may be requested via the network first strategy.

Here, the cache strategy of "cache then network" may refer to the requested data being fetched from a local cache first, and then request the data from the network if the cache is not available. More specifically, the user terminal may retrieve the data from the local cache if the data is already stored in the local cache and is still valid (i.e., not expired). If the data is not in the local cache or has expired, the user terminal may initiate a network request to fetch the latest data from the server 10 or the like.

The advantage of the "cache then network" strategy is that it may significantly reduce the wait time for users while waiting for the network request to complete, as it first attempts to use local cache. For example, the leaderboard data does not change frequently in the beginning of the event, so it may be requested via the local cache first and then via network if necessary. According to the embodiments, it may improve the responsiveness of the user terminal 20 and reduce the load on the server 10. Therefore, it helps enhance application performance and user experience.

Figure 3:
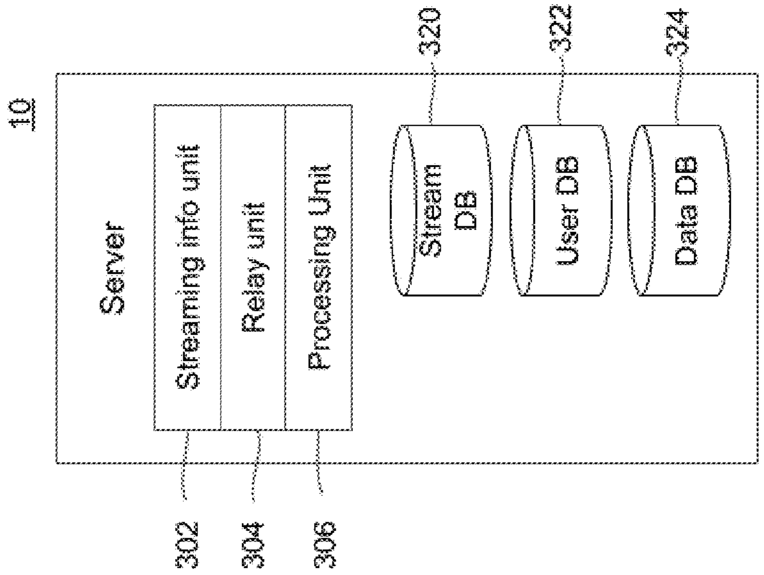
FIG. 3 is a schematic block diagram of the server 10 according to some embodiments of subject application.

FIG. 3 is a schematic block diagram of the server 10 according to some embodiments of the subject application. The server 10 may include streaming info unit 302, relay unit 304, processing unit 306, stream DB 320, user DB 322 and data DB 324.

The streaming info unit 302 receives the request of live streaming from the user terminal 20 of the livestreamer via the network NW. Once receiving the request, the streaming info unit 302 registers the information of the live streaming on the stream DB 320. In some embodiments, the information of the live streaming may be the stream ID of the live streaming and/or the livestreamer ID of the livestreamer corresponding to the live streaming.

Once receiving the request of providing the information of the live streaming from the viewing unit 200 of the user terminal 30 from the viewer via the network NW, the streaming info unit 302 refers to the stream DB 320 and generates a list of the available live streaming. The streaming info unit 302 then transmits the list to the user terminal 30 via the network NW. The UI control unit 202 of the user terminal 30 generates a live streaming selection screen according to the list and displays the list on the display of the user terminal 30.

Once the input transmit unit 206 of the user terminal 30 receives the selection of the live streaming from the viewer on the live streaming selection screen, it generates the streaming request including the stream ID of the selected live streaming and transmits to the server 10 via the network. The streaming info unit 302 may start to provide the live streaming, which is specified by the stream ID in the streaming request, to the user terminal 30. The streaming info unit 302 may update the stream DB 320 to add the viewer's viewer ID of the user terminal 30 to the livestreamer ID of the stream ID.

The relay unit 304 may relay the transmission of the live streaming from the user terminal 20 of the livestreamer to the user terminal 30 of the viewer in the live streaming started by the streaming info unit 302. The relay unit 304 may receive the signal, which indicates the user input from the viewer, from the input transmit unit 206 while the streaming data is reproducing. The signal indicating the user input may be the object-designated signal which indicates the designation of the object shown on the display of the user terminal 30. The object-designated signal may include the viewer ID of the viewer, the livestreamer ID of the livestreamer, who delivers the live streaming the viewer is viewing, and object ID specified by the object. If the object is a gift or the like, the object ID may be the gift ID or the like. Similarly, the relay unit 304 may receive the signal indicating the user input of the livestreamer, for example the object-designated signal, from the streaming unit 100 of the user terminal 20 while the streaming data is reproducing.

The processing unit 306 is configured to process requests in response to operations from a user terminal 20 or 30 of a user. For example, the user may click on the event list button to make a request on the event list. Once the relay unit 304 receives the request, the processing unit 306 may refer to the data DB 324 and retrieve the event list, and the processing unit 306 and the relay unit 304 may further transmit the event list to the user terminal 20 or 30 of the user.

FIG. 4 shows an exemplary data structure of the stream DB 320 of FIG. 3. The stream DB 320 holds information regarding a live stream currently taking place. The stream DB 320 stores a stream ID for identifying a live-stream on a live distribution platform provided by the live-streaming system 1, a livestreamer ID for identifying the livestreamer who provides the live-stream, and a viewer ID for identifying a viewer of the live-stream, in association with each other.

FIG. 5 shows an exemplary data structure of the user DB 322 of FIG. 3. The user DB 322 holds information regarding users. The user DB 322 stores a user ID for identifying a user, points for identifying the points the user accumulates, level for identifying the level of the user and status for identifying the status of the user in association with each other. The point is the electronic value circulated within the live-streaming platform. The level may be an indicator of the amount of user activity or engagement on the live streaming platform. The status may be an identity or membership status of the user on the live streaming platform.

FIG. 6 shows an exemplary data structure of the data DB 324 of FIG. 3. The data DB 324 holds data information regarding a live stream in the live distribution platform. In some embodiments, the data in the server 10 may be any possible data in a live streaming platform. Here, the leaderboard data in an event is taken as an example for explanation. The data DB 324 stores a data ID for identifying the data on a live distribution platform provided by the live-streaming system 1, and leaderboard ID for identifying a leaderboard of the data, in association with each other. The data DB 324 also stores user ID, rank and score for identifying the users in a leaderboard, their corresponding rank and score, in association with each other.

In some embodiments, the queue unit 210 may download the data from the server 10 either all at once or in batches. For example, if the server 10 has 3.000 data entries, the queue unit 210 may batch download in increments of 100 entries at a time. In some embodiments, the queue unit 210 may determine order of the data downloading. The queue unit 210 may request the leaderboard data once getting access to the leaderboard page. For example, the queue unit 210 may download the data of top 10 users in the leaderboard, so the information of the leaderboard may be displayed on the viewer's terminal.

FIG. 7 shows an exemplary data structure of the cache DB 250 of FIG. 2. The cache DB 250 holds a cache data of the data from the server 10. The cache DB 250 stores a cache ID and data ID for identifying a cache data and the corresponding data from the server 10, time tag for identifying the time information of the cache data, the URL for identifying the location of the cache data, in association with each other. In some embodiments, the cache DB 250 may also include other detailed information of each data entry.

FIG. 8 shows an exemplary data structure of the data queue DB 252 of FIG. 2. The data queue DB 252 holds information regarding the queue of data downloaded by the user terminal of the user. The data queue DB 252 stores a queue ID, progress and response for identifying a queue of the downloading, its progress and response from the server 10, in association with each other. The data queue DB 252 also stores retry count for identifying number of times to request the corresponding data, last response time for identifying the time it takes for the server 10 to respond to a request from the user terminal of the user at the last time, in association with each other. In some embodiments, the response time may be measured according to the elapsed time between when a request is made and when the server 10 sends a response back to the user terminal of the user.

In some embodiments, the progress may be the ratio of current data entry and total data entry to indicate the current progress of the download. In some embodiments, the progress may also include progress of each entry of data or each batch of data such as the progress of 1st-100th, 101st-200th entries of data or the like. In some embodiments, the last response time may be stored once a request is successful. In some embodiments, the last response time may also be stored once the request is failed for reference. In some embodiments, for the response of "Fail" due to "no response", the threshold for determining "no response" may also be used as the last response time or the like.

In some embodiments, the response may be "Success" or "Fail". The response of "Success" may refer to the requested data being successfully retrieved, processed and returned to the user terminal without errors or issues. On the other hand, the response of "Fail" may refer to the requested data being not successfully retrieved, processed and returned to the user terminal due to errors or issues. In some embodiments, the reason or error code of the response "Fail" may also be included in the response.

The reason for the response of "Fail" may be due to server unavailability, server load, network issue or the like. For example, if the server 10 fails to provide any response within a reasonable or expected time frame, the response may be "Failed" and the reason may be "no response" or the like. In some embodiments, the reasonable or expected time frame for responding to the request may be at most three seconds, five seconds or determined flexibly according to the practical need. In some embodiments, the response may show "Waiting" to indicate that the request is in the processing stage and waiting for response or the like.

Figure 9:
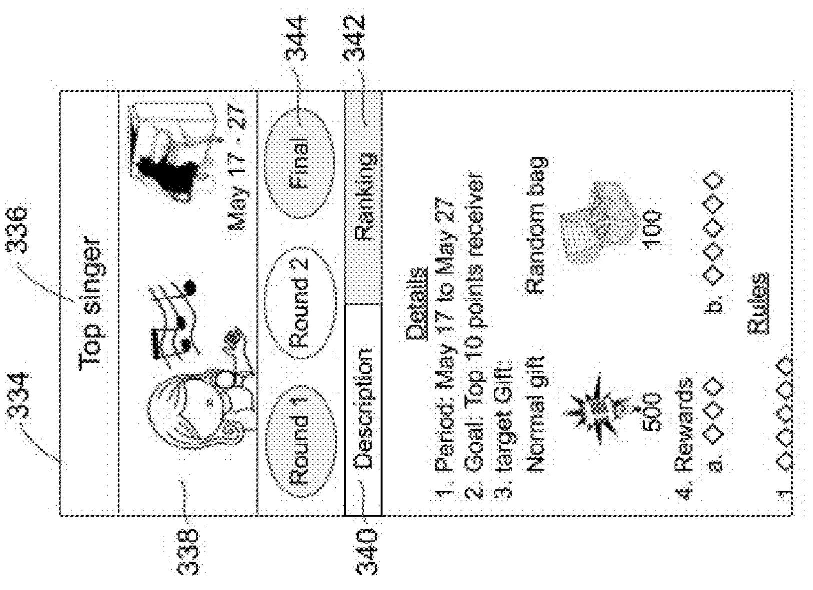
FIG. 9-FIG. 11 are exemplary screen images of a live-streaming room screen 660 shown on the display of the livestreamer user terminal 20 or the viewer user terminal 30.
Figure 10:
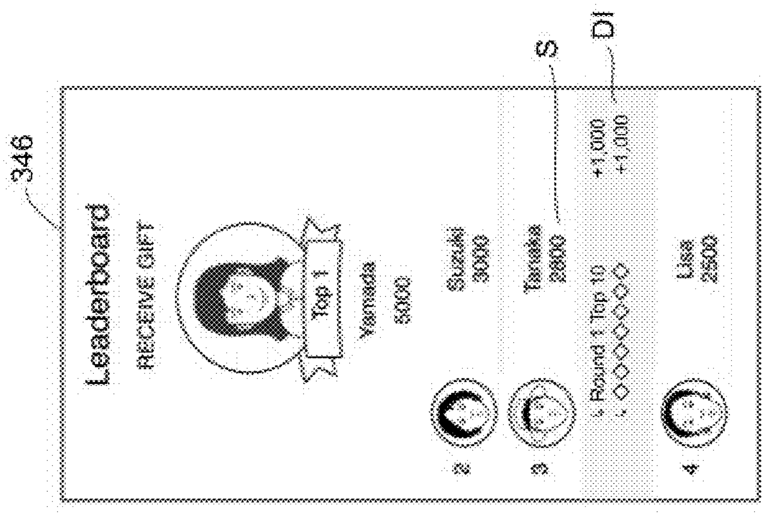
Figure 11:
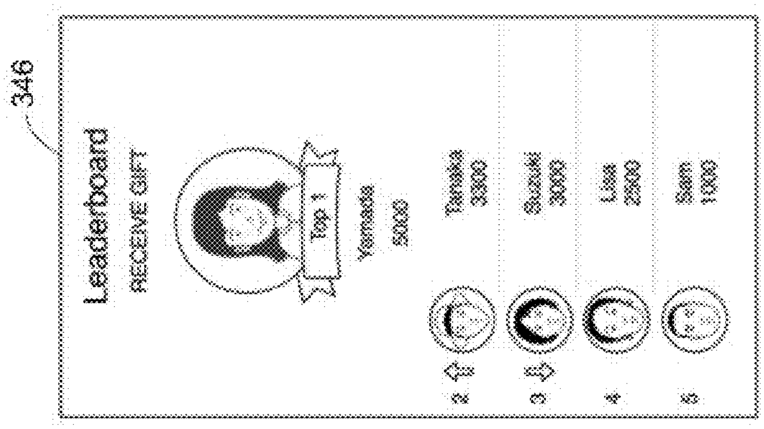

FIG. 9-FIG. 11 are exemplary screen images of a live-streaming room screen 600 shown on the display of the livestreamer user terminal 20 or the viewer user terminal 30.

FIG. 9 shows an exemplary event page 334. The viewer or livestreamer may click a button on the screen to request the event list. Once an event is selected, the corresponding event page 334 may be shown on the user terminal. As shown in FIG. 9, the event page 334 may include the title 336, banner 338, description 340 and ranking 342. In some embodiments, the event page 334 may include tab 344 to indicate the current stage of the event such as round 1, round 2, final or the like.

The user may click on the ranking 342 to check the current or historical leaderboard of the event. FIG. 10 and FIG. 11 shows an exemplary leaderboard page 346 of the ranking 342. In some embodiments, the leaderboard page 346 may display the ranking 342 of the users and their corresponding score S. In some embodiments, detailed information DI of the score S may also be displayed below each user to indicate the information of the score in detail. For example, the detailed information DI may include score bonuses, score combination, or other relevant information.

In some embodiments, the livestreamers and viewers may access the leaderboard page 346 to check the current leaderboard. Once a plurality of users accesses the leaderboard page 346 to request data from the server 10, the server's load becomes very high. If the user could not receive data from the server 10, the leaderboard page 346 may be blank and lead to bad user experience. Therefore, the user terminal may first check if the requested data is available in the cache DB 250. The terminal may further request network data from server 10 no matter whether cache data is displayed or not.

For some events, the competition is extremely intense. Especially for the last moment before the end of the event, it is always considered the most thrilling moment in an event. The viewers always gather with the livestreamer to support the livestreamer for the event. The viewers donate event gifts to the livestreamer and wait until the end of the event in order to let their favorite livestreamer win or achieve reward threshold in an event. Therefore, the information in the leaderboard page 346 may be very important and need to be retrieved and refreshed dynamically in real-time.

In some embodiments, a cache data of the leaderboard page 346 may be displayed on the user terminal 20 or 30 as shown in FIG. 10. In some embodiments, the network data from the server 10 may be displayed and refreshed in real-time as shown in FIG. 11. According to the embodiments, the users may track the current rankings on the leaderboard page 346 and help their favorite livestreamers achieve victory. The way for displaying cache data, displaying network data and refreshing the data would be described later.

In some embodiments, the processing unit 212 may be configured to determine cache strategy on the requested data. In some embodiments, the cache strategy may be determined according to a predetermined look-up table. In some embodiments, the cache strategy may be determined according to a variety of parameters. In some embodiments, the cache strategy may be determined by machine learning model or the like. In some embodiments, the cache strategy may be determined flexibly according to the practical need.

In some embodiments, the requested data may be any possible data in the live streaming platform. In some embodiments, the cache strategy may be applied to the data having starting time, ending time, in progress, or the like. In some embodiments, the requested data may also be, for example, the gift data or the like. In some embodiments, the requested data may also be other data similar to the event data, which also having starting time, ending time, in progress or the like. In some embodiments, the requested data may be determined flexibly according to the practical need.

Figure 12:
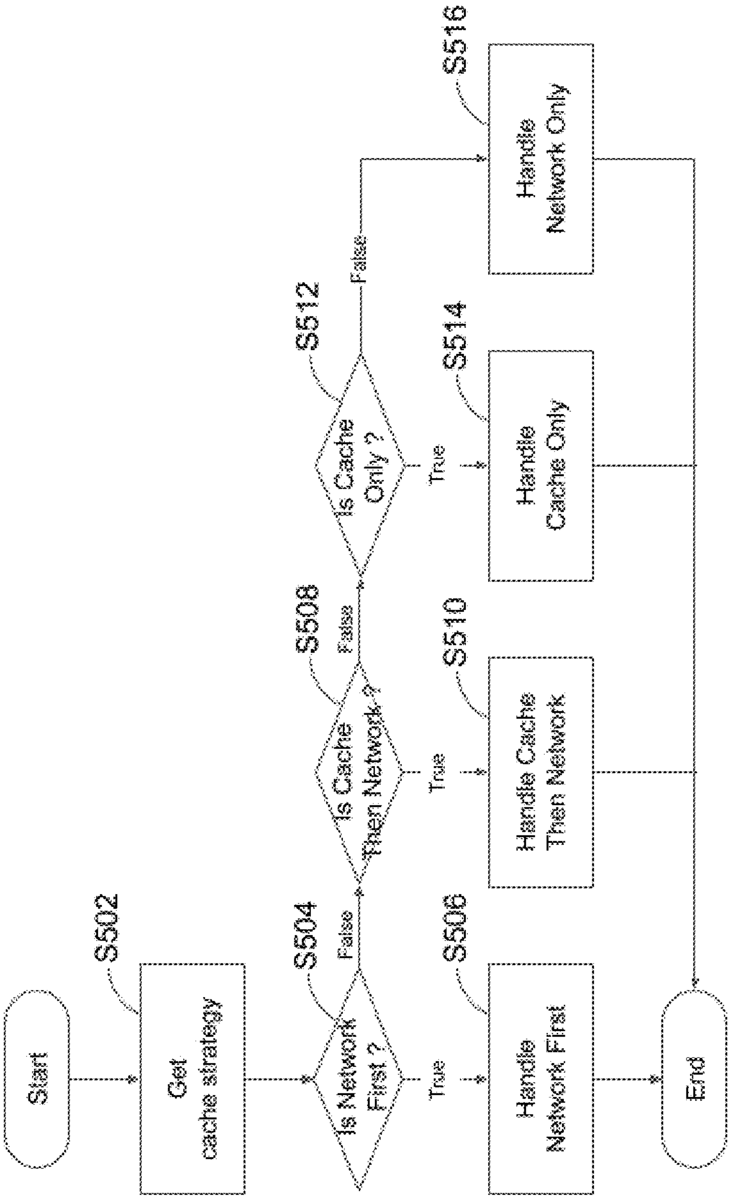
FIG. 12 is a flowchart showing steps of an application activation process on the user terminals 20 and 30.

FIG. 12 is a flowchart showing steps of an application activation process on the user terminals 20 and 30. The users may request data from the server 10 via user terminals 20 and 30. For example, the livestreamer or viewers may open the event page 334 or leaderboard page 346 to check the event description or leaderboard, and the user terminal 20 or 30 may collect a list of requests for requesting data from the server 10.

Once the data is requested, the processing unit 212 may get the cache strategy on the requested data (S502). The cache strategy may be determined flexibly. Once the cache strategy is determined, the processing unit 212 may apply for the cache strategy on the requested data. For example, if the cache strategy is network first strategy (True in S504), the processing unit 212 may handle the data via the network first strategy (S506).

In some embodiments, if the cache strategy is cache then network strategy (True in S508), the processing unit 212 may handle the data via the cache then network strategy (S510). In some embodiments, if the cache strategy is cache only strategy (True in S512), the processing unit 212 may handle the data via the cache only strategy (S514). In some embodiments, if the cache strategy is neither one of the above (False in S504, S508 and S512), the processing unit 212 may handle the data via the network only strategy or the like (S516).

In some embodiments, the cache strategy may be determined in order such as the order of network first, cache then network, cache only and network only as shown in FIG. 12. In some embodiments, the cache strategy may also be determined simultaneously. In some embodiments, once a cache strategy is determined, the processing unit 212 may directly apply for the cache strategy to request data. In some embodiments, the method for determining the cache strategy may be realized flexibly according to the practical need.

In some embodiments, the step S502 of getting the cache strategy may be realized via predetermined rules such as a look-up table or the like. FIG. 13 is a flowchart showing steps of determining cache strategy and FIG. 14 shows an exemplary data structure of cache strategy look-up table 254 of FIG. 2. As shown in FIG. 13, once the data is requested, the processing unit 212 may refer to the cache strategy look-up table 254 (S602) and get the cache strategy (S604).

The cache strategy look-up table 254 may be configured to store the relationship between the requested data, such as the API, and the cache strategy or the like. As shown in FIG. 14 as an example, the cache strategy look-up table 254 may include API ID and its corresponding cache strategy. The cache strategy look-up table 254 stores an API ID for identifying the data to be requested, and a cache strategy for identifying the cache strategy on the requested data, in association with each other.

In some embodiments, an API may be corresponding to a specific portion of data. In some embodiments, all the data may also be requested via the same API or different API, and it depends on the parameters in the API. The processing unit 212 may refer to the cache strategy look-up table 254 to determine the cache strategy according to the API ID or the like. In some embodiments, the cache strategy look-up table 254 may also include other parameters such as timing of the requested data or the like.

In some embodiments, the cache strategy of receiving data such as leaderboard data may refer to a whitelist such as the cache strategy look-up table 254. The cache strategy is always hard-coded in the whitelist or in the code. In some embodiments, the cache then network may be applied as a default cache strategy, which means that the cache may be displayed at first. In some embodiments, if the user triggered a refresh manually, it may indicate that the user would like to see the latest leaderboard data. However, using the cache-then-network strategy by default may result in briefly displaying outdated data, which may lead to user misunderstanding or the like.

In some embodiments, the step S502 of getting the cache strategy may be determined dynamically. The processing unit 212 may determine the cache strategy according to a variety of parameters. The parameters may be, for example, the timing of the event, the existence of cache, the cache history, network connection, user operation, auto-refreshing or the like. According to the auto-switching cache strategy, it may minimize potential user misunderstandings when viewing leaderboard data or the like.

FIG. 15 is an exemplary functional configuration of the events in a live streaming platform. As shown in FIG. 15, there may be a plurality of events taking place at the same time in a live streaming platform. The events may be related to different topics such as singing, newbies, Xmas or the like. Each event may have a starting time and ending time as the events E1, E2 and E3 shown in FIG. 15. In some embodiments, the event may be divided into several rounds and each round also has its starting time and ending time like event E2 shown in FIG. 15.

In some embodiments, the users may request data related to the event via the user terminal 20 or 30. For example, the livestreamers and viewers may request the leaderboard data to check the historical ranking, current ranking or the like. Moreover, the livestreamers and viewers may also request the event data to check the descriptions and rules of the event. In some embodiments, the cache strategy may be determined flexibly according to the above parameters or the like.

Figure 16:
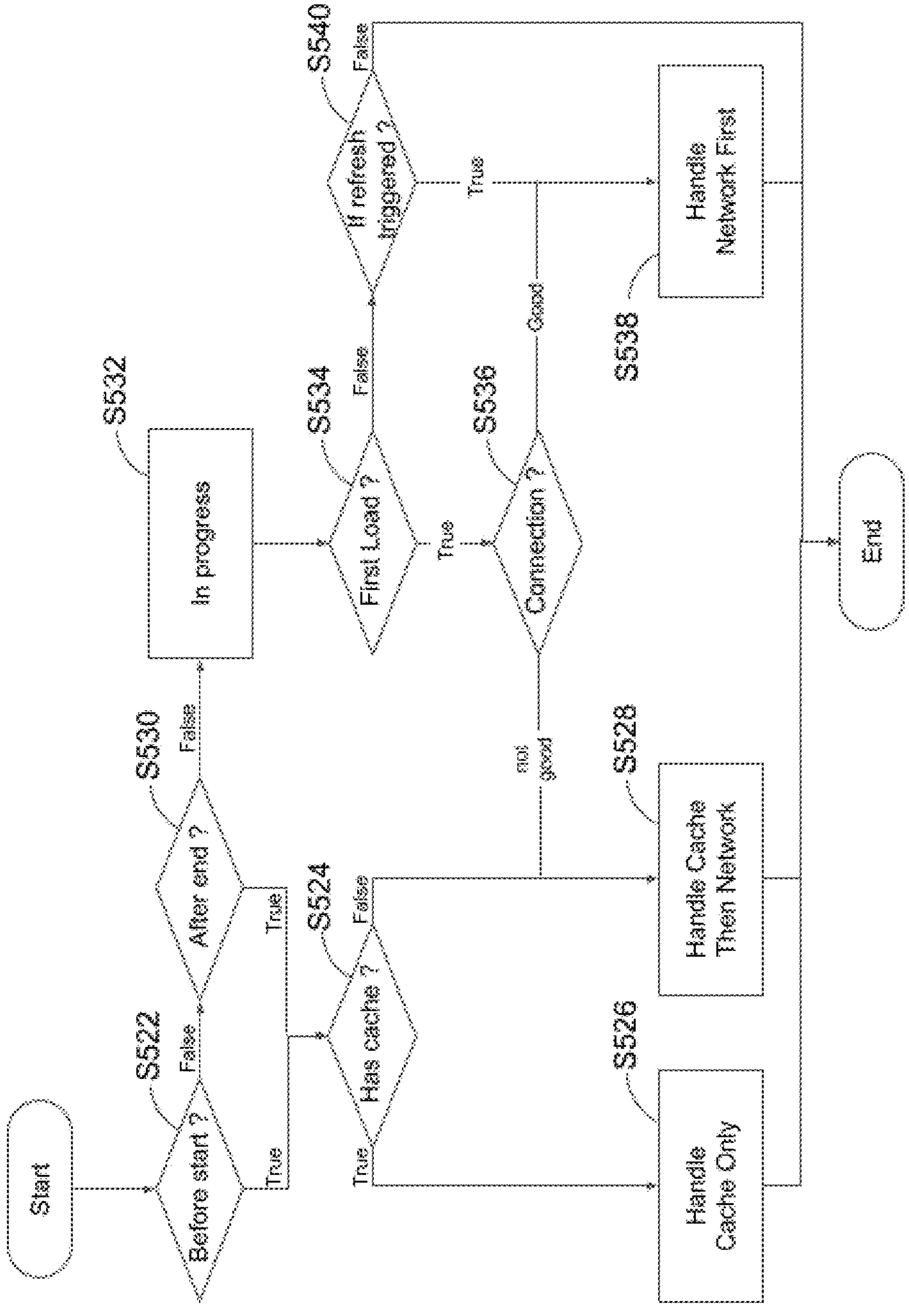
FIG. 16 is a flowchart showing steps of an application activation process on the user terminals 20 and 30.

In some embodiments, the step S502 of getting the cache strategy may also be realized dynamically. FIG. 16 is a flowchart showing steps of an application activation process on the user terminals 20 and 30. As shown in FIG. 16, the processing unit 212 may check the timing of events (S522, S530 and S532). If the event is not yet started, which is before the starting time of the event (S522), the processing unit 212 may determine whether there is a cache corresponding to the requested data (S524).

If there is a cache corresponding to the requested data (true in S524), the processing unit 212 may apply for the cache strategy of cache only (S526) as a response. If there is no cache corresponding to the requested data (false in S524), the processing unit 212 may apply for the cache strategy of cache then network (S528) as a response.

In some embodiments, if the event has already ended, which is after the ending time of the event (true in S530), the processing unit 212 may also determine whether there is a cache corresponding to the requested data (S524). The processing unit 212 may apply for the cache strategy of cache only (S526) in response to there being a cache corresponding to the requested data (true in S524), or apply for the cache strategy of cache then network (S528) in response to there being no cache corresponding to the requested data (false in S524).

In some embodiments, if the event is neither before start nor after end (false in S522 and S530), which is in the progress of the event (S532), the cache strategy of the event being in progress may be applied. In some embodiments, the processing unit 212 may determine whether the requested data is first load or not (S534).

In some embodiments, the status of "First load" may refer to the status of the request being disconnected at the beginning of the request. For example, if the server 10 has 3,000 data entries, the queue unit 210 may batch download in increments of 100 entries at a time. If no data from the 1st-100th data is requested successfully, it may be referred to as the "First load". It may refer to the situation where the user's user terminal 20 or 30 is experiencing errors or encountering problems while requesting the first portion of the data or the like.

In some embodiments, if the requested data is first load (true in S534), the processing unit 212 may determine the quality of network connection. The quality of network connection may be determined by parameters such as the speed of the network connection or the like. The processing unit 212 may detect the speed of network connection in the user terminal 20 or 30. The speed of network connection may be classified according to, for example, network status such as no connection, low 2G, 2G, 3G, 4G, 5G or above.

In some embodiments, the network status of 3G or below may be referred to as not good in connection. In some embodiments, the network status of 4G or above may be referred to as good in connection. In some embodiments, the definition of good or not good in connection may be determined flexibly according to the practical need.

In some embodiments, if the quality of network connection is not good (not good in S536), the processing unit 212 may apply for the cache strategy of cache then network as a response (S528). In some embodiments, if the quality of network connection is good (good in S536), the processing unit 212 may apply for the cache strategy of the network first as a response (S538).

In some embodiments, the quality of not good may also be referred to as bad in network connection. In some embodiments, the quality of good or not good may further be divided into different levels respectively. For example, the quality of not good may further be divided into bad and the worst, the quality of bad in network connection may correspond to the network status of 3G and 2G, and the quality of the worst in network connection may correspond to the network status of low 2G and no network connection.

In some embodiments, the cache strategy of cache then network may be applied if the quality of network connection is bad, and the cache strategy of cache only may be applied if the quality of network connection is the worst or the like. In some embodiments, the level of quality of network connection and the corresponding cache strategy may be determined flexibly according to the practical need.

If the requested data is not first load (false in S534), the processing unit 212 may determine whether there is an user operation from the user of the user terminal 20 or 30 (S540). In some embodiments, the user operation may be an operation triggered by the user or the like and the purpose of operation may be to refresh the data or the like. For example, the user may click a button or swipe down on the screen to refresh the leaderboard data on the screen of the user terminal 20 or 30.

If a refresh is triggered (true in S540), the processing unit 212 may apply for the cache strategy of the network first as a response. In some embodiments, if there is no refresh triggered (false in S540), no cache strategy may be applied and the process of getting the cache strategy may be ended. For example, the user may just be idle on the leaderboard page 346 without doing anything or the like. According to the embodiments, the cache strategy of network first may be applied once the user triggers a refresh on the leaderboard data, and the user experience may be improved.

In some embodiments, an auto-refresh mechanism may also be applied. The auto-refresh mechanism may refer to the data being refreshed automatically, for example, for a specific period or the like. In some embodiments, if there is no refresh triggered (false in S540), the processing unit 212 may further check if auto-refresh is on or not. In some embodiments, if the auto-refresh mechanism is on, the processing unit 212 may apply for the cache strategy of the network first as a response. In some embodiments, if the auto-refresh mechanism is off, no cache strategy may be applied and the process of getting the cache strategy may be ended.

The event may have different periods such as before the starting, in progress, after ending of the event. At different time points during the event, there will be varying levels of data request traffic. According to the above embodiments, the cache strategy may be determined automatically and dynamically. For example, the processing unit 212 may check if there is an available cache before the start or after the end of the event, and then determine the cache strategy accordingly.

Moreover, the cache strategy may also be determined according to the network connection. The processing unit 212 may also determine the cache strategy according to the quality of network connection while the event is in progress. The processing unit 212 may also determine the cache strategy according to the user operation such as manual refresh or the like. Therefore, the user experience may be improved.

According to the above embodiments, the cache strategy may be determined dynamically before, during and after an event. The server load may be reduced and the responsiveness of the user terminal 20 or 30 may also be improved. The auto-switching cache strategy may also minimize potential user misunderstandings. Therefore, the user experience may be improved.

Figure 17:
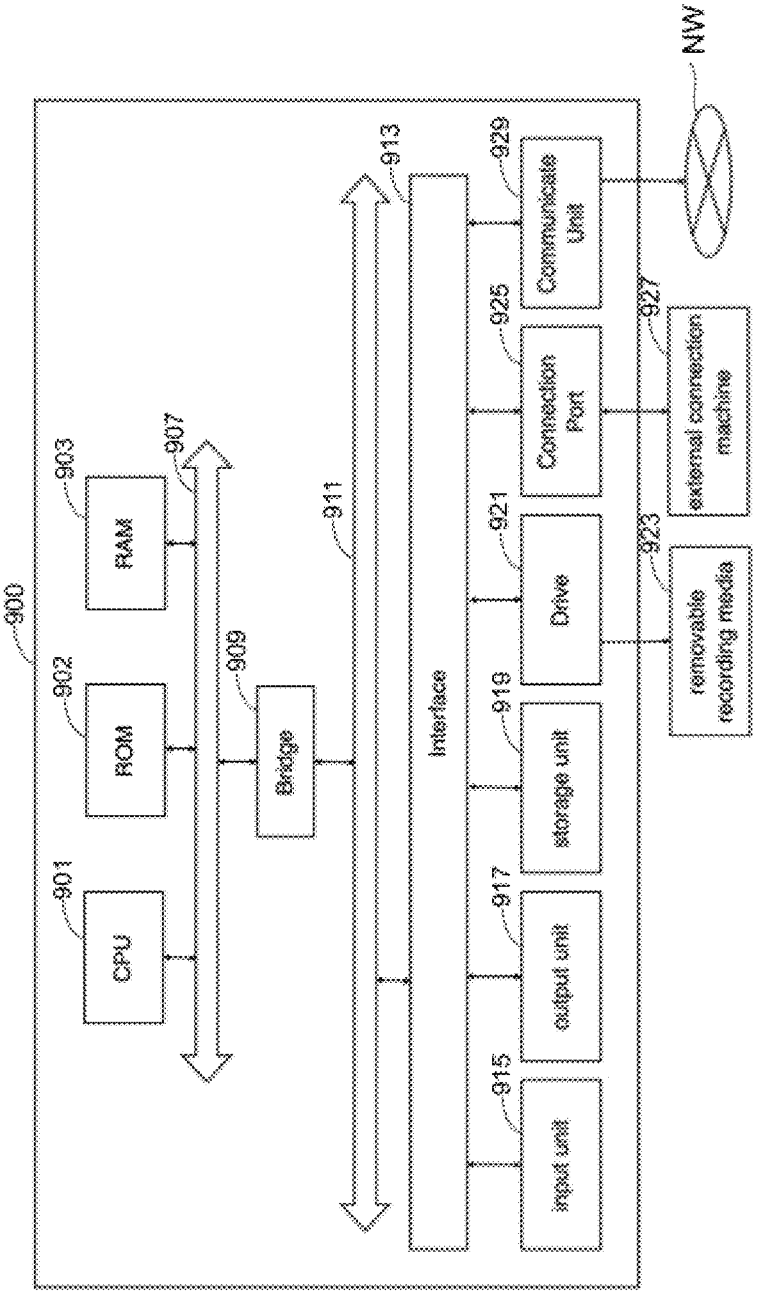
FIG. 17 is an exemplary hardware configuration of the information processing device according to some embodiments of subject application.

FIG. 17 is a schematic block diagram of computer hardware for carrying out a system configuration and processing according to some embodiments of subject application. The information processing device 900 in FIG. 17 is, for example, is configured to realize the server 10 and the user terminal 20, 30 respectively according to some embodiments of subject application.

The information processing device 900 includes a CPU 901, read only memory (ROM) 902, and random-access memory (RAM) 903. In addition, the information processing device 900 may include a host bus 907, a bridge 909, an external bus 911, an interface 913, an input unit 915, an output unit 917, a storage unit 919, a drive 921, a connection port 925, and a communication unit 929. The information processing device 900 may include imaging devices (not shown) such as cameras or the like. The CPU 901 is an example of hardware configuration to realize various functions performed by the components described herein. The functions described herein may be realized by circuitry programmed to realize such functions described herein. The circuitry programmed to realize such functions described herein includes a central processing unit (CPU), a digital signal processor (DSP), a general-use processor, a dedicated processor, an integrated circuit, application specific integrated circuits (ASICs) and/or combinations thereof. Various units described herein as being configured to realize specific functions, including but not limited to the streaming unit 100, the viewing unit 200, the video control unit 102, the audio control unit 104, the distribution unit 106, the UI control unit 108, the UI control unit 202, the rendering unit 204, the input transmit unit 206, the streaming info unit 302, the relay unit 304, the processing unit 306, the stream DB 320, the user DB 322, the data DB 324, the cache unit 208, the queue unit 210, the cache DB 250, the data queue DB 252 and so on, may be embodied as circuitry programmed to realize such functions.

The CPU 901 functions as an arithmetic processing device and a control device, and controls the overall operation or a part of the operation of the information processing device 900 according to various programs recorded in the ROM 902, the RAM 903, the storage unit 919, or a removable recording medium 923. For example, the CPU 901 controls overall operations of respective function units included in the server 10 and the user terminal 20 and 30 of the above-described embodiment. The ROM 902 stores programs, operation parameters, and the like used by the CPU 901. The RAM 903 transiently stores programs used when the CPU 901 is executed, and parameters that change as appropriate when executing such programs. The CPU 901, the ROM 902, and the RAM 903 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input unit 915 is a device operated by a user such as a mouse, a keyboard, a touchscreen, a button, a switch, and a lever. The input unit 915 may be a device that converts physical quantity to electrical signal such as audio sensor (such as microphone or the like), acceleration sensor, tilt sensor, infrared radiation sensor, depth sensor, temperature sensor, humidity sensor or the like. The input unit 915 may be a remote-control device that uses, for example, infrared radiation and another type of radio waves. Alternatively, the input unit 915 may be an external connection device 927 such as a mobile phone that corresponds to an operation of the information processing device 900. The input unit 915 includes an input control circuit that generates input signals on the basis of information which is input by a user to output the generated input signals to the CPU 901. The user inputs various types of data and indicates a processing operation to the information processing device 900 by operating the input unit 915.

The output unit 917 includes a device that can visually or audibly report acquired information to a user. The output unit 917 may be, for example, a display device such as an LCD, a PDP, and an OLED, an audio output device such as a speaker and a headphone, and a printer. The output unit 917 outputs a result obtained through a process performed by the information processing device 900, in the form of text or video such as an image, or sounds such as audio sounds.

The storage unit 919 is a device for data storage that is an example of a storage unit of the information processing device 900. The storage unit 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 903. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection device 927 to the connection port 925 makes it possible to exchange various kinds of data between the information processing device 900 and the external connection device 927.

The communication unit 929 is a communication interface including, for example, a communication device for connection to a communication network NW. The communication unit 929 may be, for example, a wired or wireless local area network (LAN), Bluetooth (registered trademark), or a communication card for a wireless USB (WUSB).

The communication unit 929 may also be, for example, a router for optical communication, a router for asymmetric digital subscriber line (ADSL), or a modem for various types of communication. For example, the communication unit 929 transmits and receives signals on the Internet or transmits signals to and receives signals from another communication device by using a predetermined protocol such as TCP/IP. The communication network NW to which the communication unit 929 connects is a network established through wired or wireless connection. The communication network NW is, for example, the Internet, a home LAN, infrared communication, radio wave communication, or satellite communication.

The imaging device (not shown) is a device that images real space using an imaging device such as a charge coupled device (CCD) or a complementary metal oxide semiconductor (CMOS), for example, and various members such as a lens for controlling image formation of a subject image on the imaging device and generates a captured image. The imaging device may capture a still picture or may capture a movie.

The present disclosure of the live streaming system 1 has been described with reference to embodiments. The above-described embodiments have been described merely for illustrative purposes. Rather, it can be readily conceived by those skilled in the art that various modifications may be made in making various combinations of the above-described components or processes of the embodiments, which are also encompassed in the technical scope of the present disclosure.

The procedures described herein, particularly flowchart or those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present disclosure.

In some embodiments, at least a part of the functions performed by the server 10 may be performed by other than the server 10, for example, being performed by the user terminal 20 or 30. In some embodiments, at least a part of the functions performed by the user terminal 20 or 30 may be performed by other than the user terminal 20 or 30, for example, being performed by the server 10. In some embodiments, the rendering of the frame image may be performed by the user terminal 30 of the viewer, the server 10, the user terminal 20 of the livestreamer or the like.

Furthermore, the system and method described in the above embodiments may be provided with a computer-readable non-transitory storage device such as a solid-state memory device, an optical disk storage device, or a magnetic disk storage device, or a computer program product or the like. Alternatively, the programs may be downloaded from a server via the Internet.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed but includes another variation and modification that do not disobey the present disclosure, and is the scope covered by the following patent application scope.

What is claimed is:

1. A method for handling data in a live streaming platform, comprising:

requesting event-related data from the live streaming platform; and determining cache strategy according to timing of progress of an event; wherein the step of determining the cache strategy further includes determining the cache strategy according to the timing of the progress of the event being before starting time, after ending time or in progress.

2. The method according to claim 1, further comprising:

determining whether there is a cache corresponding to the data in response to the timing is not in progress;

applying for the cache strategy of the cache only in response to there being an available cache corresponding to the data.

3. The method according to claim 1, further comprising:

determining whether there is a cache corresponding to the data in response to the timing is not in progress;

applying for the cache strategy of the cache then network in response to there being no available cache corresponding to the data.

4. The method according to claim 1, further comprising:

determining whether a requesting of data is first load in response to the timing is in progress; and determining a quality of network connection in response to the requested data being first load;

applying for the cache strategy of network first in response to the quality of the network connection being good.

5. The method according to claim 1, further comprising:

determining whether a requesting of data is first load in response to the timing is in progress; and determining a quality of network connection in response to the requested data being first load;

applying for the cache strategy of cache then network in response to the quality of the network connection being not good.

6. The method according to claim 1, further comprising:

determining whether it is first load of the data in response to the timing is in progress;

determining whether there is a refresh triggered from a user of a user terminal in response to the requested data being not first load;

applying for the cache strategy of network first in response to the refresh triggered from the user of the user terminal.

7. The method according to claim 1, further comprising:

determining whether there is an auto-refresh mechanism applied in response to the timing is in progress and the requested data being not first load;

applying for the cache strategy of network first in response to an auto-refresh mechanism is applied.

8. A terminal comprising a circuitry, wherein the circuitry is configured to perform:

requesting event-related data from a live streaming platform; and determining cache strategy according to timing of progress of an event;

determining whether there is a cache corresponding to the data in response to the timing is not in progress; and applying for the cache strategy of the cache only in response to there being an available cache corresponding to the data; or applying for the cache strategy of the cache then network in response to there being no available cache corresponding to the data.

9. The terminal according to claim 8, wherein the step of determining the cache strategy further includes determining the cache strategy according to the timing of the progress of the event being before starting time, after ending time or in progress.

10. The terminal according to claim 8, further comprising:

determining whether it is first load of the data in response to the timing is in progress;

determining whether there is a refresh triggered from a user of a user terminal in response to the requested data being not first load;

applying for the cache strategy of network first in response to the refresh triggered from the user of the user terminal.

11. The terminal according to claim 8, further comprising:

determining whether there is an auto-refresh mechanism applied in response to the timing is in progress and the requested data being not first load;

applying for the cache strategy of network first in response to an auto-refresh mechanism is applied.

12. A method for handling data in a live streaming platform, comprising:

requesting event-related data from the live streaming platform; and determining cache strategy according to timing of progress of an event;

determining whether a requesting of data is first load in response to the timing is in progress;

determining a quality of network connection in response to the requested data being first load; and applying for the cache strategy of network first in response to the quality of the network connection being good; or applying for the cache strategy of cache then network in response to the quality of the network connection being not good.

13. The method according to claim 12, wherein the step of determining the cache strategy further includes determining the cache strategy according to the timing of the progress of the event being before starting time, after ending time or in progress.

14. The method according to claim 12, further comprising:

determining whether it is first load of the data in response to the timing is in progress;

determining whether there is a refresh triggered from a user of a user terminal in response to the requested data being not first load;

applying for the cache strategy of network first in response to the refresh triggered from the user of the user terminal.

15. The method according to claim 12, further comprising:

determining whether there is an auto-refresh mechanism applied in response to the timing is in progress and the requested data being not first load;

applying for the cache strategy of network first in response to an auto-refresh mechanism is applied.

* * * * *